(12) United States Patent
Rosenhaft et al.

(10) Patent No.: US 8,073,784 B2
(45) Date of Patent: *Dec. 6, 2011

(54) MULTI-FUNCTION CODE ACTIVATED PRODUCT AND SERVICE DELIVERY

(75) Inventors: Matthew Rosenhaft, Atlanta, GA (US); Barry Brager, Smyrna, GA (US)

(73) Assignee: Starpound Corporation, Smyrna, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/983,378

(22) Filed: Jan. 3, 2011

(65) Prior Publication Data

US 2011/0098850 A1 Apr. 28, 2011

Related U.S. Application Data

(63) Continuation of application No. 11/320,932, filed on Dec. 29, 2005, now Pat. No. 7,865,447, which is a continuation of application No. 10/037,378, filed on Oct. 23, 2001, now Pat. No. 6,990,472.

(60) Provisional application No. 60/265,760, filed on Feb. 1, 2001, provisional application No. 60/242,511, filed on Oct. 23, 2000.

(51) Int. Cl.
*G06Q 20/00* (2006.01)

(52) U.S. Cl. .......................................... 705/64; 455/3.03

(58) Field of Classification Search .................... 705/14, 705/16–18, 26–27, 42, 64–79; 707/999; 709/201–203, 217–219; 455/3, 413–415
See application file for complete search history.

(56) References Cited

U.S. PATENT DOCUMENTS 5,216,703 A 6/1993 Roy (Continued)

FOREIGN PATENT DOCUMENTS

EP 0 812 120 A3 5/1999

(Continued)

OTHER PUBLICATIONS

Beaudry et al., "Global System for Mobile Communications" Telesis, n 94, Jul. 1992 pp. 52-69, ISSN: 0040-2710.

(Continued)

*Primary Examiner* — Mary Cheung
(74) *Attorney, Agent, or Firm* — Michael J. Mehrman; Mehrman Law Office P.C.

(57) ABSTRACT

A system for providing a wide range of telecommunications initiated data fulfillment services in which a multi-function code, such as "*#" (star, pound), input into an originating telecommunications device, such as a conventional land-line or wireless telephone, triggers the treatment of the input sequence as a multi-function code service request rather than a dialed directory number. The multi-function code is followed by an input data string to complete the multi-function code service request, which the user typically enters into the telecommunications device just like a conventional telephone call, except that the input string begins with the multi-function code. The telecommunications system recognizes the multi-function code as a trigger, and in response takes one or more actions, such as automatically terminating the call to an announcement and routing a data message to a data fulfillment center, which responds to the message by implementing a response action indicated by the multi-function code service request. For example, the data fulfillment center may respond by transmitting a message over a wireless data network or the Internet to implement a service, such as activation of a vending machine, remote control of device, delivery of a message over the Internet or wireless data network, initiation of an interactive Internet session with the originating device, or a wide range of other services. In addition, a charge for this service may be automatically charged to an account associated with the originating telecommunications device, which may be billed separately or incorporated on the user's conventional monthly telecommunications invoice.

20 Claims, 7 Drawing Sheets

U.S. PATENT DOCUMENTS

| | | | |
|---|---|---|---|
| 5,867,780 | A | 2/1999 | Malackowski et al. |
| 5,963,452 | A | 10/1999 | Etoh et al. |
| 6,029,065 | A | 2/2000 | Shah |
| 6,035,189 | A | 3/2000 | Ali-Vehmas et al. |
| 6,056,194 | A | 5/2000 | Kolls |
| 6,122,501 | A | 9/2000 | Gallant |
| 6,181,935 | B1 | 1/2001 | Gossman et al. |
| 6,411,803 | B1 | 6/2002 | Malackowski et al. |
| 6,763,336 | B1 | 7/2004 | Kolls |
| 6,990,472 | B2 | 1/2006 | Rosenhaft et al. ............... 705/77 |
| 2003/0036376 | A1 | 2/2003 | Annan et al. |

FOREIGN PATENT DOCUMENTS

| | | |
|---|---|---|
| WO | WO9800987 | 1/1998 |
| WO | WO 0049795 | 8/2000 |

OTHER PUBLICATIONS

Toward Definition of the SPIRITS Architecture: SPIRITS Interfaces L. Slutsman—AT&T Labs 4 pages.

NEC Implementation for ICW Service NEC America, Inc. 28 pages.

Toward Definition of the Protocol for PSTN-initiated Services Supported by PSTN/Internet Interworking I. Faynberb, H. Lu, M. Weissman—Lucent Technologies: L. Slutsman—AT&T.

Request for Comments 3298—Memo I Fayberg, Editor—Lucent Technologies; J. Gato—Vodaphone; H. Lucent Technologies; L. Slutsman—AT&T Aug. 2002; 15 pages.

Request for Comments 1122 R. Braden, Editor Oct. 1989; 116 pages.

U.S. Appl. No. 60/240,642, filed Oct. 16, 2000, Annan, David B.

Yuzhang Li, Tan Yw, Fangchun Yang, Junliang Chen, Personal Service really putting the telephone users in the driver's seats, 157-163.

L. R. Bowyer, R. B. Robrock, Intelligent Network Services for Data Customers.

Ram P. Batnl, IEEE in '96 Workshop; Apr. 21-24, 1996.

S. Y. Yeh, Global Intelligent Networking: Architectures, Services and Design Principles, 455-460.

P. H. Vapheas, B.A. Polonsky, A.M. Gopin, R.J. Wojcik, Advanced Intelligent Network : Evolution, 1991, 941-947.

Robert Epley, Betb Ann Polonsky, Stanley Yeh, Advanced Intelligent Network Services Evolution, 1990, 0197-0205.

MULTI-FUNCTION CODE ACTIVATED PRODUCT AND SERVICE DELIVERY

REFERENCE TO RELATED APPLICATIONS

This application is a continuation application claiming priority to U.S. patent application Ser. No. 11/320,932 filed Dec. 29, 2005, now U.S. Pat. No. 7,865,447, which is a continuation application claiming priority to U.S. patent application Ser. No. 10/037,378 filed Oct. 23, 2001, now U.S. Pat. No. 6,990,472, which claims priority to commonly owned U.S. Provisional Patent Applications 60/265,760 filed Feb. 1, 2001 and 60/242,511 filed Oct. 23, 2000, which are incorporated herein by reference.

TECHNICAL FIELD

This invention relates generally to a telecommunications initiated data fulfillment system in which a telecommunications input sequence including a multi-function code sequence, such as a "star-pound" (i.e., *#) sequence, initiates an automatic data fulfillment service. The system can be used for a wide variety of applications including but not limited to mobile vending, mobile data delivery, mobile Internet access, mobile WAP communications, on-demand delivery of promotional information, and many others.

BACKGROUND OF THE INVENTION

Due to the communications boom brought on by the popularization of wireless communication devices and the Internet, there presently exists an increasing opportunity for telecommunications initiated services involving these increasingly prominent media. However, the configuration and operation of the existing telephone networks, wireless data networks, and the Internet inhibits the implementation of many new services that would rely on the integrated operation of these systems. Therefore, there presently exists an opportunity for improving the integration of the telecommunications system, the wireless data system, and the Internet to provide a wide range of new services that can be conveniently and cost effectively provided through these media.

SUMMARY OF THE INVENTION

The present invention meets the needs described above in a system for providing a wide range of telecommunications initiated data fulfillment services in which a multi-function code, such as "*#" (star, pound), input into an originating telecommunications device, such as a conventional land-line or wireless telephone, triggers the treatment of the input telephone sequence as a multi-function code service request rather than a dialed directory number. The multi-function code is followed by an input data string to complete the multi-function code service request, which the user typically enters into the telecommunications device just like a conventional telephone call, except that the input string begins with the multi-function code (e.g., *#).

The telecommunications system recognizes the multi-function code as a trigger, and in response takes one or more actions in response to the trigger, such as automatically terminating the call to an announcement and routing a data message to a data fulfillment center. This data message typically includes the multi-function code service request and data string input by the customer along with identifying information for the initiating telecommunications device, such as the directory number assigned to the originating telecommunications device. The data message may include location information pertaining to the originating telecommunications device, such as information identifying the originating MTSO and cell tower. The message is typically transmitted to the data fulfillment center using the telecommunications system's signaling system, such as the SS7 signaling system currently deployed for most land-based telephone systems, or the X-25 signaling system currently deployed for most mobile telephone systems in the United States and Canada. Analogous signaling systems are deployed in telecommunications systems worldwide.

The data fulfillment center responds to the message by implementing a response action indicated by the multi-function code service request. For example, the data fulfillment center may respond by transmitting a message over a wireless data network or the Internet to implement a service, such as activation of a vending machine, remote control of device, delivery of a message over the Internet, delivery of a message over a wireless data network, initiation of an interactive Internet session with the originating device, or a wide range of other services. In addition, a charge for this service, if appropriate, may be automatically charged to an account associated with the originating telecommunications device, which may be billed separately or incorporated on the user's conventional monthly telecommunications invoice. Those skilled in the art will appreciate that the range of telecommunications initiated services that may be implemented in this manner is virtually limitless, and many different services will become apparent once the fundamental principles of the invention are understood.

Generally described, the invention includes a method for implementing a telecommunications initiated data fulfillment service. A telecommunications switch receives a communication from a telecommunication device comprising an input sequence including a multi-function key sequence. The telecommunications switch recognizes the multi-function key sequence as a trigger code and identifies an identification code associated with the telecommunication device, such as the directory number, MIN or EIN assigned to the telecommunication device. In response to the detected trigger event, the telecommunications switch looks up a pre-defined data address associated with the input sequence, the identification code, or a combination of the input sequence and the identification code. The telecommunications switch then assembles a data message associated with the input sequence, the identification code, or a combination of these items, and transmits the data message to the data address, which is also associated with a data fulfillment platform. The data fulfillment platform associated with the data address then implements an appropriate response action in response to the data message.

Typically, the data message includes at least the input sequence and the identification code associated with telecommunication device, and may also include location information associated with the originating telecommunications device, such as information identifying the MTOS and cell tower where the multi-function code service request was initially received. In addition, the data address to which the message is sent is typically associated with a data fulfillment center or Internet service provider operated by a provider of the telecommunications initiated data fulfillment service. This enables the service provider to respond to the message by implementing the appropriate telecommunications initiated data fulfillment service, such as activating a vending machine and charging an account associated with the originating telecommunications device for the delivered product, sending an e-mail to an address associated with the originating telecommunications device, remotely controlling a device, initiating an interactive Internet session with the originating telecommunications device, or performing any other suitable service.

In a mobile vending application, for example, the identification code may be used to identify an account associated with the telecommunications device, and the data fulfillment center may remotely activate the vending machine and charge a cost associated with the data message to the account associated with the telecommunications device. In particular, the data fulfillment center may identify a product code from a pre-defined set of digits in the input sequence; and may activate the vending device to deliver a product-associated with the product code in response to the data message. To implement security, the data fulfillment center may also look up a pre-defined PIN associated with the telecommunications device, identify a PIN-sequence from a predefined set of digits in the input sequence, and compare the personal identification number to the PIN-sequence.

In addition, the telecommunications switch typically delivers an audio or data response to the telecommunications device indicating that the multi-function code service request has been received. The telecommunications switch then discontinues the communication, which frees the originating telecommunications device to receive an incoming data or telecommunications message associated with the requested data fulfillment service. For example, the telecommunications device may receive an incoming wireless data network communication, telephone call, or e-mail message as part of the data fulfillment service. In one alternative, the input sequence includes a directory number associated with an Internet site, and the data message initiates an Internet session between the telecommunications device and the Internet site. In this alternative, the telecommunications switch may forward the communication to a platform operated by an Internet service provider, and an incoming the wireless data network communication may initiate an interactive Internet session with the telecommunications device. In addition, the Internet service provider may automatically link the telecommunications device to the Internet site associated with the directory number included in the input sequence at the onset of the Internet session.

The data fulfillment center may also receive location data associated with the telecommunications device, and customize an action taken in response to the data message based on the location information. For example, the location data may indicate the MTSO and cell tower that initially received the multi-function code service request from the telecommunications device, and the data fulfillment center may customize its response by sending a mobile vending activation message to a vending machine located in the coverage area of the identified cell tower. This feature advantageously allows reuse of the vending codes in multiple locations served by different cell towers.

The data fulfillment center may also look up customer profile data corresponding to the identification code associated with the telecommunications device, and implement a response in accordance with this profile. For example, the customer profile may implement spending limits, location use limits, alternative addresses for routing responses, and so forth. Typically, the customer profile may be altered by the user, for example through Internet access. For this reason, the pre-defined data address may be a user-defined portion of the customer profile data. The data fulfillment center may also detect that the telecommunications device does not correspond to a subscriber of the telecommunications initiated data fulfillment service, and automatically link the telecommunications device to a platform configured to register the user of the telecommunications device as a subscriber of the telecommunications initiated data fulfillment service.

The telecommunications device may retrieve the pre-defined data address, typically the address for the data fulfillment center or an Internet service provider, from a home location register associated with a mobile telecommunication system. In addition, the data message is typically delivered to the data address through a signaling system message, such as an SS7 or X-25 message. In addition, the identification code associated with the telecommunications device may be extracted from a call detail record created by a telecommunications switch receiving the communication. The pre-defined data address may be retrieved from a proprietary database maintained by a provider of the telecommunications initiated data fulfillment service.

In addition, the data fulfillment center may respond to the data message by transmitting a control signal to operate a remote device. For example, the response action may open a car lock or garage door, activate or deactivate a security system, program a remote device, or perform a wide range of other remote control operations. In another alternative, the input sequence may include a displayed item code associated with a product or service offered for sale. In this case, the data fulfillment center may respond to the data message by: looking up an e-mail address associated with the telecommunications device, and transmitting an electronic message including promotional information concerning the product or service offered for sale to the address associated with the telecommunications device.

In this specification, certain actions are described as being performed by a telecommunications switch and others are described as being performed by a data fulfillment platform. However, those skilled in the art will appreciate that these devices could be combined into a single device or system of devices, and the invention defined by the method and steps described herein is not limited to performance by any particular devices. For example, some or all of the steps described as performed by the switch may be performed by the data fulfillment platform, and vice versa. In addition, a third device may be deployed to implement certain steps. These types of variations are within the scope of the present invention.

In addition, the originating telecommunications device is shown in certain figures and described as being a wireless or land-line telephone device. However, those skilled in the art will appreciate that the originating telecommunications device may be any type of device, known at present or developed in the future, capable of initiating telecommunications. In particular, wireless telephones, land-line telephones, desktop computers, portable computers, personal digital assistants, pagers, and so forth are within the scope of the term "telecommunications device" as used in this specification. Further, the methods and systems described herein are not limited to any particular type of telecommunication initiation, such as dialing or keypad input. Rather, the methods and systems described in this specification may work with any type of telecommunication initiation, known at present or developed in the future, such as voice recognition, auto dialing, e-mail, message relay, and the like.

In view of the foregoing, it will be appreciated that the present invention greatly improves the integration of the telecommunications system, the wireless data system, and the Internet to provide a wide range of new services that can be conveniently and cost effectively provided through these media. The specific techniques and structures employed by the invention as improvements over the drawbacks of the present telecommunications infrastructure and accomplish the advantages described above will become apparent from the following detailed description of the embodiments of the invention and the appended drawings and claims.

DETAILED DESCRIPTION OF THE EMBODIMENTS

The present invention may be embodied in a telecommunications initiated data fulfillment system that typically involves a number of telecommunications switches and one or more data fulfillment platforms. The telecommunications switches are configured to recognize a multi-function code, such as "*#" (star, pound), as a trigger event. In response to a detected trigger event, the receiving telecommunications switch typically holds the call and looks up an instruction set associated with the trigger, and implements that instruction set. The multi-function code may include the "star, pound" initiation code followed by an instruction index indicating an instruction set to be implemented. For example, *#1 may indicate a mobile vending instruction set, *#2 may indicate a mobile data delivery instruction set, *#3 may indicate an Internet access instruction set, *#4 may indicate a remote control instruction set, and so forth.

The instruction set for different services may vary, but typically includes instructions or directions to the telecommunications switch to route the call to an announcement, assemble a data message of predefined structure, and transmit the data message to an address associated with a data fulfillment platform. For example, the announcement may state, "Your mobile vending request has been received and will be acted on immediately. Thank you." The data message typically includes the identifying information for the originating telecommunications device, such as the directory number assigned to that device, and the multi-function code service request, which is the input string entered into the telecommunications device to initiate the service. The data message may also include location data pertaining to the originating telecommunications device, such as information identifying the MTSO and cell tower that initially received the communication from the telecommunications device. The data message is typically delivered to the data fulfillment platform using the conventional signaling system, such as the SS7 signaling system used for most land-line systems, or the X-25 signaling system used for most mobile systems in the United States and Canada.

The data fulfillment platform typically looks up a customer profile associated with the identifying information for the originating telecommunications device, which may be programmed by the customer using an Internet interface or other suitable access method. The customer profile specifies the customer's desired delivery terms, such as an account to charge for vending services, an e-mail address for delivering data messages, addresses for devices to be remotely controlled, and so forth. The customer profile may also include service-limiting terms, such as spending limits, security procedures, geographical use limits, and the like. In addition, the data fulfillment platform may look up information for responding to the data request based on the input sequence. For example, in an Internet access service, the input sequence may correspond to a desired Internet address, and the data fulfillment may initiate an Internet session between the originating telecommunications device and a machine associated with the desired Internet address. In particular, the directory number assigned to a person's wireless telephone may be associated with that same person's Internet address, so that the input of an appropriate multi-function code followed by the directory number assigned to a person's wireless telephone may automatically cause an Internet session to be initiated between the originating telecommunications device and the machine associated with the desired Internet address.

Thus, in one embodiment, the telecommunications system recognizes the multi-function code as a trigger, and in response automatically terminates the call to an announcement and routes a message to a data fulfillment center. This message typically includes the multi-function code service request input by the customer along with identifying information for the initiating telecommunications device (e.g., originating directory number, MIN, EIN or another suitable identifier), and may include additional information, such as location information (e.g., information identifying the originating MTSO and cell tower) pertaining to the originating telecommunications device. The message is typically transmitted to the data fulfillment center using the telecommunications system's signaling system, such as the advanced intelligent network (AIN), the SS7 signaling system currently deployed for most land-based telecommunications systems, or the X-25 signaling system currently deployed for most mobile telecommunications systems.

The data fulfillment center responds to the message by implementing a service connoted by the multi-function code service request. For example, the data fulfillment center may respond by transmitting a message over a wireless data network or the Internet to implement a service, such as activation of a vending machine, remote control of a device, delivery of a message over the Internet, delivery of a message over a wireless data network, or initiation of an interactive Internet session with the originating device. A charge for this service, if appropriate, may be automatically charged to an account associated with the originating telecommunications device, which may be billed separately or incorporated on the user's conventional monthly telecommunications invoice.

Although a virtually limitless number of service options may be initiated and billed for, if desired, in this manner, several particularly strategic services are described in this specification to illustrate this technology. A first example is mobile vending, in which a series of product codes may be displayed on a vending machine. To make a purchase, the customer enters the multi-function code, such as "*#" (star, pound), into his or her wireless telecommunications device, optionally followed by a service index (e.g., "1" to indicate mobile vending), followed by the displayed product code (e.g., a six digit numeric code represented as "xxx yyy") followed by his or her personal identification number (PIN) (e.g., a four digit numeric code represented as "zzzz"). This thirteen digit data entry (e.g., *#1 xxx yyy zzzz) resembles a three digit multi function code (e.g., *#1) followed by a conventional ten digit directory number (xxx yyy zzzz). In response to this multi-function code, the data fulfillment center transmits a wireless data message to the vending machine to activate delivery of the indicated product, and charges an account associated with the originating telecommunications device for the purchase. Those skilled in the art will appreciate that the process described above may be used to implement a nationwide or worldwide cashless, secure and convenient telecommunications initiated mobile vending system.

A second example of this technology is mobile data acquisition. For example, an advertiser may display an advertising code rather than a vending code. A different service index, may be used to distinguish mobile data acquisition from mobile vending (e.g., "*#2" indicates mobile data acquisition, whereas "*#1" indicates mobile vending). In addition, if the user is not to be charged for this service, the user's PIN may not be required as part of the multi-function code service request. Thus, the advertising code may be up to a ten digit code, which results in up to a thirteen digit multi-function code service request similar in format to that used for mobile vending. In response to the multi-function code service request, the data fulfillment center typically sends an e-mail message to an e-mail address stored in association with the customer's originating directory number. For example, a restaurant may display an advertising code, and the data fulfillment center may respond to receipt of a multi-function code service request containing the restaurant's advertising code by e-mailing the restaurant's menu to an e-mail address associated with the directory number assigned to the originating telecommunications device.

The system described above may be used to deliver virtually any type of data associated with a displayed advertising code, such as product information, driving directions, coupons, financial prospectus, inventory listing, safety guidelines, repair instructions, schematic diagram, event ticketing or access credentials, photograph, weather forecast, music file, and the like. The proprietor simply displays in any appropriate media a message to the effect of, "To obtain more information dial *#2 xxx yyy zzzz." Of course, the multi-function code service request may be altered to provide PIN security and transaction-based billing for the delivered data if desired. Those skilled in the art will appreciate that the process described above may be used to implement a nationwide or worldwide telecommunications initiated data delivery system to aid in billboard, print media, broadcast and other types of advertising and sale of information.

Figure 1:
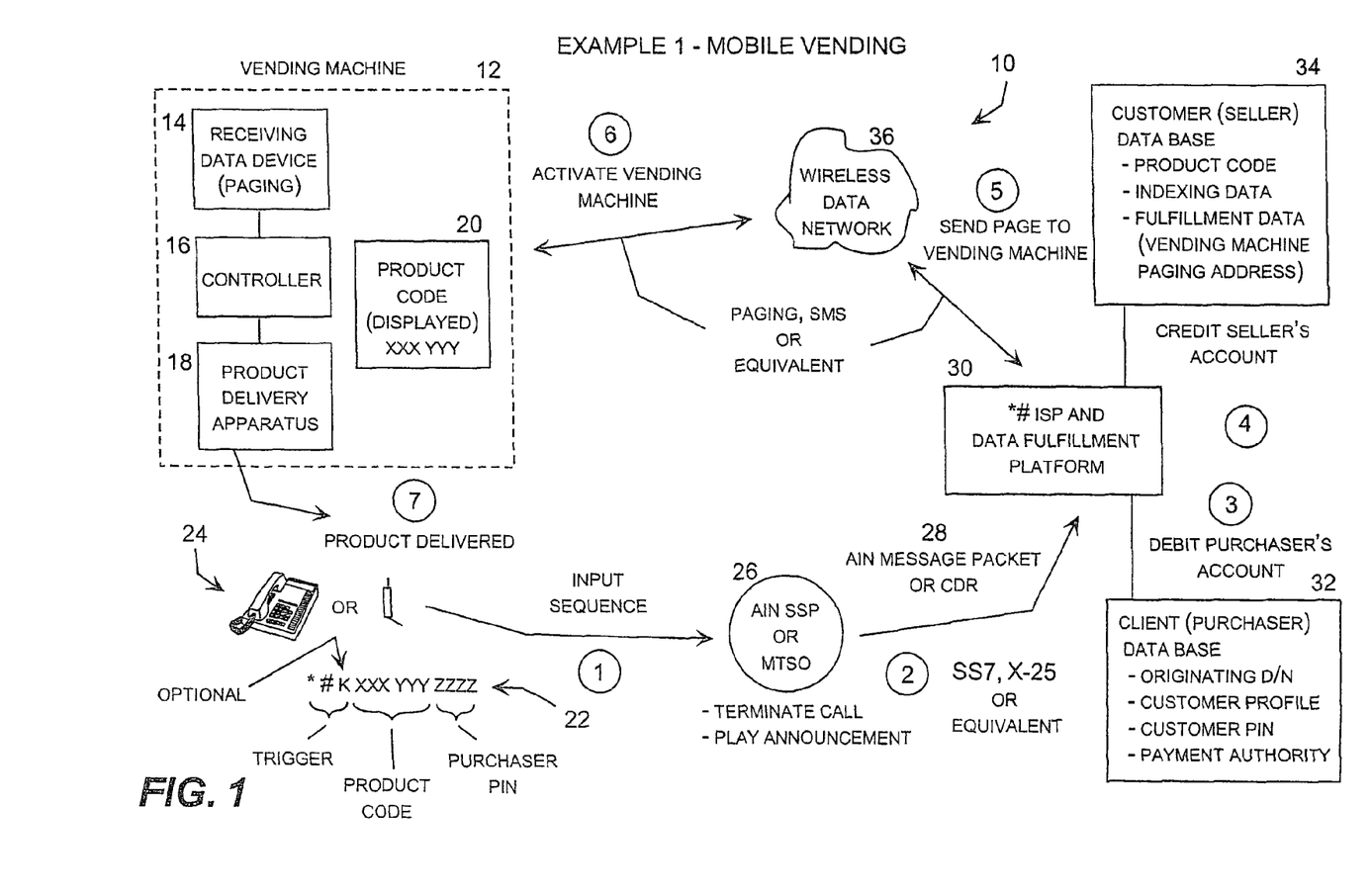
FIG. 1 is a functional diagram of a mobile vending service implemented by a telecommunications initiated data fulfillment system.

Additional applications of this technology, and specific implementation details, are described below with reference to the appended figures. Turning now to the drawings, in which like numerals refer to like elements throughout the several figures, FIG. 1 is a functional diagram of a mobile vending service implemented by a telecommunications initiated data fulfillment system 10. In this type of system, the products to be sold are typically located within a vending machine 12 that includes data receiving device 14, such as a paging unit, short messaging system (SMS), wireless data, or other suitable wireless data receiving device. Although a wireless data receiving device should be preferred for most applications, the data receiving device 14 may alternatively be a land-line device, such as a telephone device, Internet connection, e-mail receiving device, or any other suitable data receiving device. The only requirement for the data receiving device 14 is that is be operational for receiving control commands from a remote location for operating the vending machine 12. The vending machine may be operable to sell a wide variety of products, such as food, drinks, tokens for operating other machines, cameras, movie tickets, clothing, gasoline and so forth.

The vending machine 12 also includes a controller 16, a product delivery apparatus 18 and a product code display 20. The controller 16 is operationally interfaced with the wireless data device 14 and the product delivery apparatus 18, which allows the product delivery apparatus 18 to be operated in response to control commands from a remote location by the data receiving device 14. Typically, the product code display 20 includes a different displayed product code for each type of product that may be sold through the vending machine 12. In this particular example, the displayed product code is a six digit numeric code in the form "xxx yyy." It will be appreciated, however, that the mobile vending system 10 could utilize any other type of code that can be entered into a telecommunications device.

To make a purchase from the vending machine 12, a customer of the telecommunications initiated data fulfillment system 10 simply enters an easily ascertained multi-function code service request into an originating telecommunications device, such as his or her mobile telephone. For example, the multi-function code service request may include a predefined multi-function code, such as *# (star, pound), which may optionally include an index connoting mobile vending (e.g., index=1 for mobile vending), followed by the displayed product code for the desired product, followed by the customer's personal identification number (PIN), into his or her mobile telephone. Thus, the multi-function code service request in this instance may be "#1 xxx yyy zzz" where "#" is the predefined multi-function code, "1" is an index indicating mobile vending, "xxx yyy" is the displayed product code for the desired product, and "zzzz" is the customer's PIN number.

In response to receiving this multi-function code service request, the mobile vending system 10 validates the customer's PIN, may apply conditions based on a customer profile and/or location data associated with the originating telecommunications device, and makes a determination whether the requesting vending purchase is authorized. If the vending purchase is authorized, the mobile vending system 10 remotely activates the vending machine 12 to deliver the purchased product, and charges an account associated with the originating telecommunications device for the cost of the purchase. This cost may be separately billed, or it may be incorporated on the customer's monthly telecommunications invoice.

More particularly, FIG. 1 illustrates the steps implemented to complete the mobile vending transaction described above. In step one, the customer enters the appropriate input string 22, namely the multi-function code service request described above, into his or her telecommunications device 24. The input string 22 is received at a trigger-enabled telecommunications switch 26, such as an advanced intelligent network (AIN) enabled system switching point (SSP) or mobile telephone switching office (MTSO). Although this will typically be the first telecommunications switch to receive the input string 22, it is possible that a prior switching device, such as a non-trigger-enabled switch, will initially receive and route the call to the trigger-enabled telecommunications switch 26. This switch is configured to detect and recognize the "*#" (star, pound) multi-function code as a trigger event. In response to detecting the star, pound trigger event, the switch 26 holds the call and looks up an instruction set to implement. Typically, the switch 26 may be configured to look up and implement ten different multi-function code instruction sets, as indicated by an index included in the first digit following the multi-function code. For example *#1 may indicate a mobile vending instruction set. Those skilled in the art will appreciate that AIN enabled SSP and MTSO devices are conventionally equipped to recognize trigger events, to look up instruction sets, and to implement those instruction sets. In this manner, the mobile vending system 10 anticipates the use of presently existing telecommunications system features to implement this new service.

The mobile vending instruction set typically instructs the switch 26 to terminate the call to an appropriate announcement. For example, the announcement may state, "Your mobile vending request has been received and will be acted on immediately. Thank you." At the end of the announcement, the call is discontinued, which frees the customer's telecommunications device to engage in a subsequent communication. The mobile vending instruction set also instructs the switch 26 to look up a data address, assemble a data message 28, and send the data message to the data address. For example, the data address may identify a data fulfillment platform 30 operated by the proprietor of the mobile vending system 10. The data message typically includes the identifying information for the originating telecommunications device 24, such as the directory number assigned to that device, and the multi-function code service request, which is the input sequence 22 entered into the telecommunications device to initiate the service.

In a mobile vending application, the data message should also include location data pertaining to the originating telecommunications device, such information identifying the MTSO and cell tower that initially received the communication from the telecommunications device. This allows the data fulfillment platform 30 to customize its response by sending a mobile vending activation message to the appropriate vending machine 12, which is located in the coverage area of the identified cell tower. This feature advantageously allows reuse of the vending codes in multiple locations served by different cell towers.

In step 2, the switch 26 delivers the data message 28 to the data fulfillment platform 30. The data message is typically delivered to the data fulfillment platform using the conventional signaling system, such as the SS7 signaling system used for most land-line systems, or the X-25 signaling system used for most mobile systems in the United States and Canada. However, another type of data system could be used, such as the Internet, an intranet, or another suitable communications medium.

For example, the information needed to create the data message 28 may be obtained from a conventional call detail record (CDR) created by the switch 26. It will be appreciated that virtually all telecommunications switches create CDRs as part of their normal operations. These CDRs include the input sequence and the originating directory number for all telecommunications calls originated by the switch, and for MTSO systems include location information regarding the originating location of the call, and therefore contain the information necessary to assemble the data message 28. Accordingly, a proprietary device may read the information necessary to assemble the data message 28 from a completed CDR, and the proprietary device may, in turn, assemble the data message 28. This may be advantageous to shift the processing burden associated with assembling the data message 28 from the switch 26 to the proprietary device. A completed CDR record may be read directly from the switch 26, or from another device, such as a mediation device used to integrate the switch 26 with a billing system computer in some applications. In addition, to reduce latency in creation of the data message 28, it may also be advantageous to read the in-process CDRs as they are created by the switch 26, so that the data message 28 may be assembled contemporaneously with the handling of the incoming call by the switch. Those skilled in the art will appreciate that a "sniffer" circuit or similar type of data tap may be installed on the switch 26 to read and pass on in-process CDR information to the proprietary device.

The data fulfillment platform 30 receives the data message 28, and readily identifies the originating telecommunications device 24 from the directory number assigned to that device, which is included as part of the data message. The data fulfillment platform 30 also identifies the product code and the customer's PIN from the input sequence, which is also part of the data message 28. The data fulfillment platform 30 also identifies the location of the originating telecommunications device 24, which corresponds to the location of the vending machine 12, from the location data included in the data message 28. From the information, the data fulfillment platform 30 processes the multi-function code service request to complete the transaction.

More specifically, the data fulfillment platform 30 maintains a client data base 32 containing customer profile data indexed to the directory number assigned to each customer's telecommunications device. Of course, another data item may be used as the indexing parameter so long as the information contained in the data message 28 is sufficient to identify the correct customer profile record in the client data base 32. This customer profile record typically includes the directory number assigned to the corresponding customer's telecommunications device (or other indexing parameter), the customer's PIN, payment authority (e.g., credit account, debit account, wire transfer, or other payment authority), and may include other customer profile data to implement security or other types of purchasing limits. For example, the customer profile data may include spending limits, geographical use limits, and other suitable parameters for the data fulfillment platform 30 to use in determining whether to validate and execute a received multi-function code service request. The customer may preferably access his or her customer profile data to change the parameters, including the customer's PIN and other security parameters, on an as-needed basis. Additional security measures, such as encryption keys and other types of electronic identification (e.g., storage and receipt of "mother's maiden name" and other techniques familiar to those skilled in the art), may be implemented at the data fulfillment platform 30 to prevent unauthorized access and alteration of customer profile data.

In step 3, the data fulfillment platform 30 validates the received multi-function code service request, typically verifying that the correct PIN is included in the input sequence 22. The data fulfillment platform 30 also determines whether to execute the purchase based on the customer profile data, and by checking whether payment authority is presently valid for the amount of the requested purchase. If the request is valid and authorized, the data fulfillment platform 30 charges the cost of the purchase to the customer's account. In step 4, the data fulfillment platform 30 credits the vendor's account for the amount of the purchase, which is typically entered into a customer database 34 maintained or contacted by the data fulfillment platform 30. That is, the data fulfillment platform 30 completes the financial portion of the transaction by charging the customer's account, and crediting the vendor's account, for the amount of the purchase.

In step 5, the data fulfillment platform 30 implements the response action, namely, remote activation of the vending machine 12 to deliver the purchased product to the customer. This is typically implemented by sending a wireless data message from the data fulfillment platform 30 to the vending machine 12 over a wireless data network 36. Alternatively, a paging system, short messaging system associated with a mobile telephone system, or other type of wireless data message may be used. In addition, if the vending machine 12 has some type of land-line connection, a land-line telephone, Internet or similar type of message may be used to activate the vending machine. The only requirement is that the data fulfillment platform 30 be capable of remotely activating the vending machine 12, either directly or indirectly, after it has verified the multi-function code service request and validated the payment authorization, and in connection with completing the financial portion of the transaction.

Although the mobile vending system 10 is described above in connection with a remotely operated vending machine 12, it should be appreciated that an analogous system could be used to implement a cashless vending system without the use of physical vending machines. That is, the vending machine could be effectively replaced by a "cashless register" operated by a vendor, in which the activation message is replaced by a payment confirmation message. For example, a purchaser may enter a product code into his or her telecommunications device in a store environment, and the data fulfillment platform 30 may send a payment confirmation message back to the vendor's telecommunications device, after the data fulfillment platform 30 has verified the multi-function code service request and validated the payment authorization, and in connection with completing the financial portion of the transaction. In this manner, the vendor's telecommunications device acts as a "cashless register" in a cashless vending system.

In another alternative, the originating telecommunications device 24 may serve as the receiving device for the response action to the multi-function code service request. Similarly, another machine, such as a home computer identified in the customer' profile, could serve as the receiving device. This alternative is particularly useful for implementing a delivery system for electronic information, such as news, music, multimedia, literature, and so forth. In addition, if the data delivery is free, the PIN code and financial steps are not necessary, which simplifies the data fulfillment process. In this type of application, the customer may simply enter a multi-function code service request including an advertising code, and automatically receive a data transmission corresponding to the advertising code. The system described above may be used to deliver virtually any type of data associated with a displayed advertising code, such as product information, driving directions, coupons, financial prospectus, inventory listing, safety guidelines, repair instructions, schematic diagram, event tickets and access credentials, photograph, weather forecast, music file, and the like. In addition, the customer may specify the receiving device for the information in his or her customer profile maintained in the client database 32. For example, a first device may be identified for receiving music, another device may be identified for receiving literature, and a third device may be identified for receiving weather or driving instructions. Because the customer may alter his or her customer profile "on the fly" using his or her telecommunications device to access the data fulfillment platform 30, the system described has a great flexibility and may be used for many types of data fulfillment services.

Figure 2:
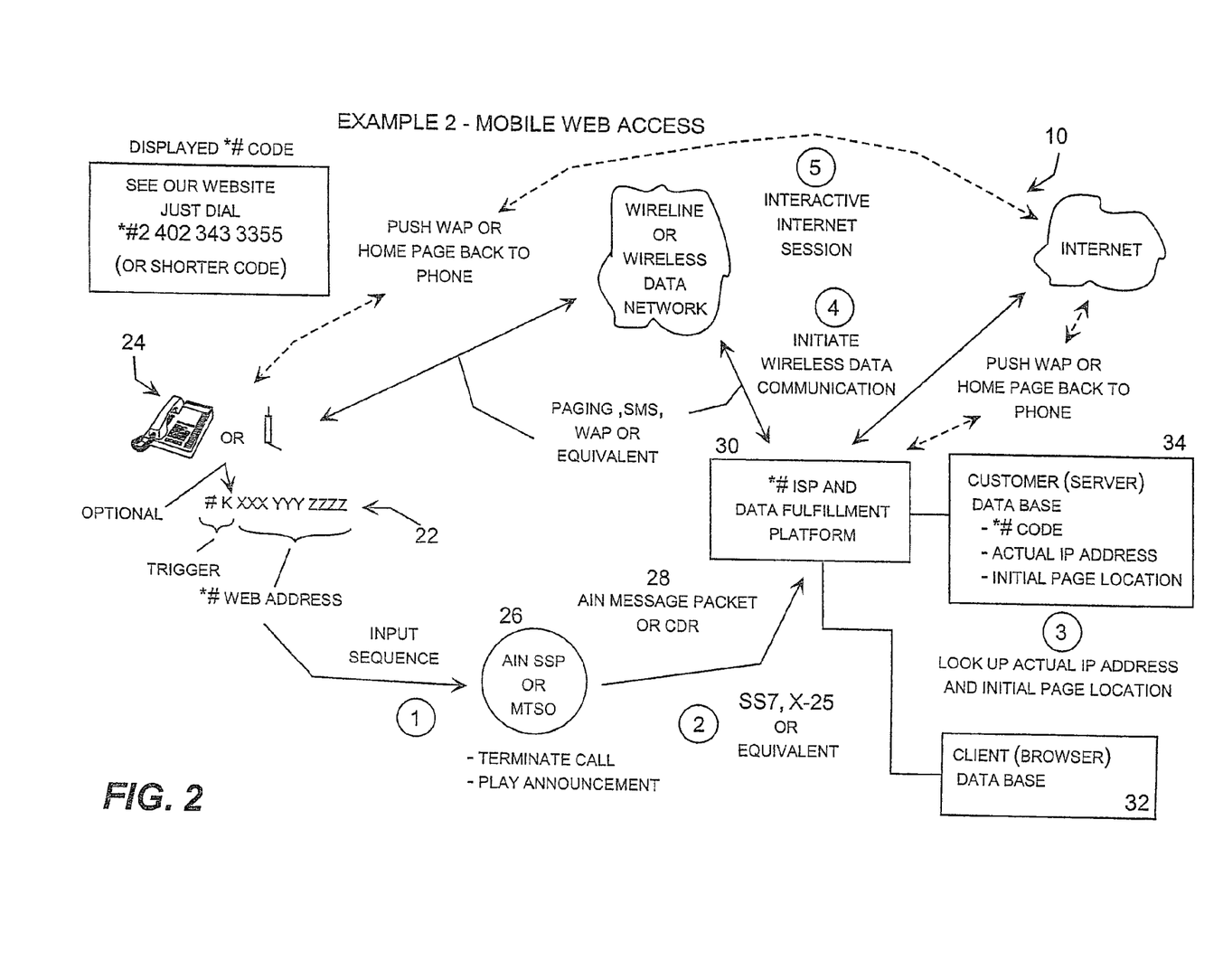
FIG. 2 is a functional diagram of a mobile web access service implemented by a telecommunications initiated data fulfillment system.

FIG. 2 is a functional diagram of a mobile web access service implemented by the telecommunications initiated data fulfillment system 10. This system is similar to the system described above, except that a displayed advertising code is associated with an Internet, mobile browser or WAP address, and as the response action, the data fulfillment platform 30 initiates an interactive Internet session between the originating telecommunications device 24 and the Internet, mobile browser or WAP site identified by the advertising code. In other words, the customer simply enters the appropriate multi-function code service request into his or her wireless telecommunications device, the data fulfillment platform 30 responds by initiating an interactive Internet session with the originating telecommunications device 24 and pushing a WAP, mobile browser or Internet page back to the originating telecommunications device 24 to initiate the session. It should be noted that the multi-function code service request may be entered with the originating telecommunications device 24 in an analog "normal telephone" mode. That communication is terminated to an announcement and then discontinued to free the originating telecommunications device 24 to receive the incoming Internet, mobile browser or WAP page, which will typically be received in a digital or "Internet" mode. Thus, this application may be implemented on most WAP, mobile browser or Internet enabled wireless telecommunications devices without having to alter the device to include a modem or to accommodate on-line mode switching.

More particularly, in step one, the customer enters the appropriate input string 22, namely the multi-function code service request described previously, into his or her telecommunications device 24. The input string 22 is received at a trigger-enabled telecommunications switch 26, such as an advanced intelligent network (AIN) enabled system switching point (SSP) or mobile telephone switching office (MTSO). This switch is configured to detect and recognize the "*#" (star, pound) multi-function code as a trigger event. In response to detecting the star, pound trigger event, the switch 26 holds the call and looks up an instruction set to implement. For example *#2 may indicate a mobile web access instruction set.

The mobile web access instruction set typically instructs the switch 26 to terminate the call to an appropriate announcement. For example, the announcement may state, "Your mobile web access has been received and will be acted on immediately. Please place your device in an Internet mode, if appropriate, and keep it idle for a few moments. Thank you." At the end of the announcement, the call is discontinued, which frees the customer's telecommunications device to receive an incoming or "pushed" WAP, mobile browser or Internet page, and engage in an Interactive Internet session. The mobile web access instruction set also instructs the switch 26 to look up a data address, assemble a data message 28, and send the data message to the data address. For example, the data address may identify a data fulfillment platform 30 operated by the proprietor of the telecommunications initiated data fulfillment system 10. The data message typically includes the identifying information for the originating telecommunications device 24, such as the directory number assigned to that device, and the multi-function code service request, which is the input sequence 22 entered into the telecommunications device to initiate the service. In a mobile web access application, the data message may not include the customer's PIN or location data. However, these parameters may be included if financial and/or location-based processing is implemented. This might be the case, for example, if the accessed Internet site is a commercial site, such as an on-line shopping venue.

In step 2, the switch 26 delivers the data message 28 to the data fulfillment platform 30. The data message is typically delivered to the data fulfillment platform using the conventional signaling system, such as the SS7 signaling system used for most land-line systems, or the X-25 signaling system used for most mobile systems in the United States and Canada. However, another type of data system could be used, such as the Internet, an intranet, or another suitable communications medium. For example, the information needed to create the data message 28 may be obtained from a conventional call detail record (CDR) created by the switch 26, as described previously.

The data fulfillment platform 30 receives the data message 28, and readily identifies the originating telecommunications device 24 from the directory number assigned to that device, which is included as part of the data message. The data fulfillment platform 30 also identifies the advertised code, and optionally the customer's PIN from the input sequence, which is also part of the data message 28. From the information, the data fulfillment platform 30 processes the multi-function code service request to complete the transaction.

In step 3, the data fulfillment platform 30 obtains the appropriate Internet, mobile browser or WAP address from a customer data base 40, which indexes the displayed advertising code to an Internet address and an initial page location. In step 4, the data fulfillment platform 30, which in this application is operating as an Internet Service Provider, links to the Internet, mobile browser or WAP address. In step 5, the data fulfillment platform 30 pushes the appropriate page back to the originating telecommunications device 24 to initiate an interactive Internet session.

In a variation of this service, a directory number assigned to a person's wireless telecommunications device may serve as a "star, pound" WAP or mobile browser access code. That is, the input directory number may implement a voice-channel telephone call to the person's wireless telecommunications device, whereas the input of "star, pound" may implement a digital WAP or mobile browser communication to the same device. In this manner, any type of analog or digital information may be conveyed to a telecommunications device using the same directory number. Is should be appreciated that this dual-use directory number concept will greatly facilitate the integration of wireless telecommunications and wireless data functionality, and has the potential to greatly expand mobile computing capabilities.

Figure 3:
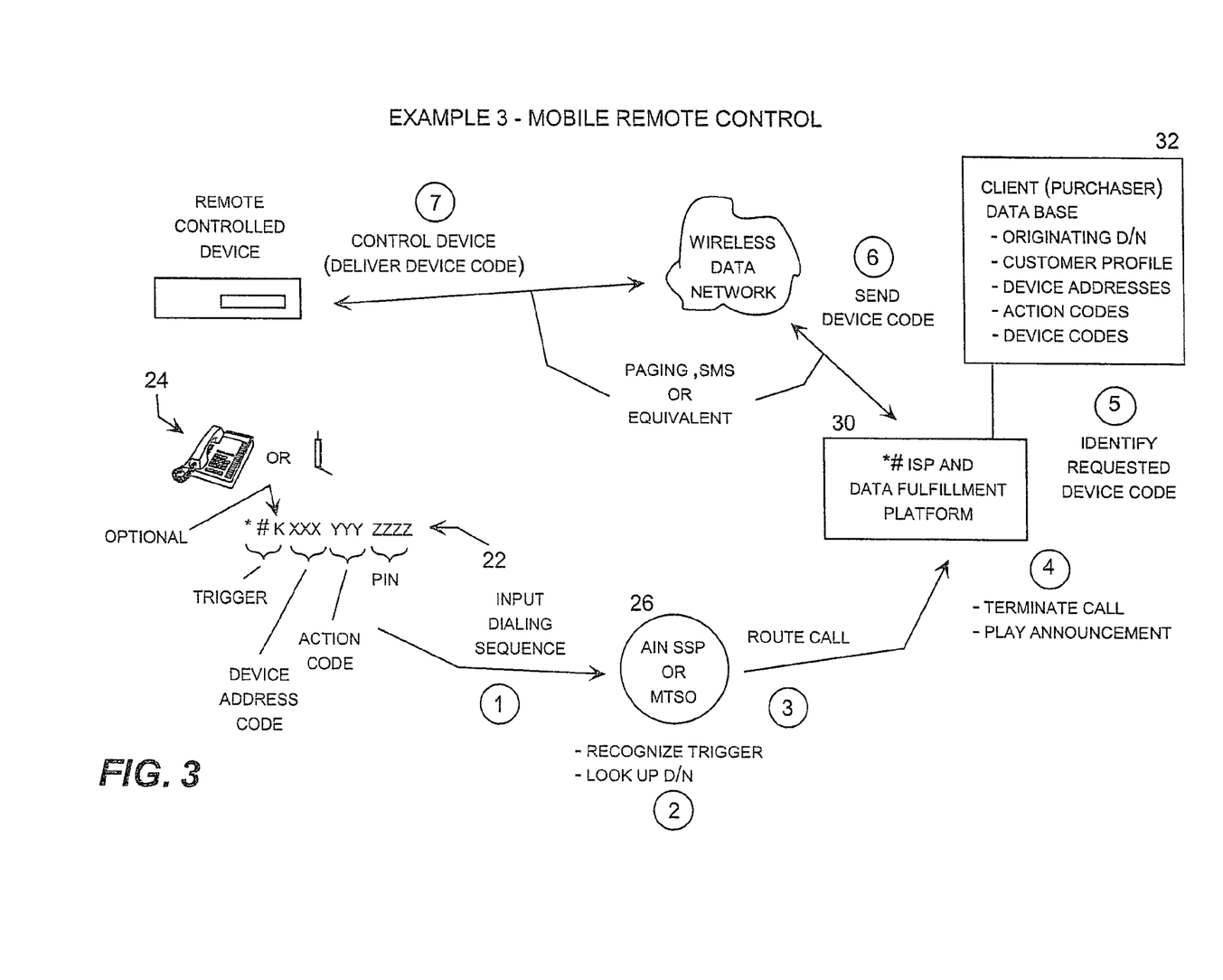
FIG. 3 is a functional diagram of a mobile remote control service implemented by a telecommunications initiated data fulfillment system.

FIG. 3 is a functional diagram of a mobile remote control service implemented by a telecommunications initiated data fulfillment system. This system is virtually the same as the mobile vending system described with reference to FIG. 1, except that the customer's equipment may be remotely controlled with the system. For example, this system may be used to open car or garage doors, activate or deactivate security systems, program devices, and so forth. For example, this type of system could be used to remotely disable a stolen automobile, activate an alarm in the automobile, or to deter theft and aid in the apprehension of the thief. Alternatively, this type of system could be used to remotely activate a GPS tracking system and/or alarm system to help track and locate missing persons or pets. On a different note, the system could be used to remotely disable telephones and televisions in a teenager's room at a specified hour, disable vehicles or other appliances while a homeowner is away, and so forth. Or it could be used to remotely activate pet or livestock feeding equipment, or turn on lawn sprinklers, or initiate data downloads, on demand or according to a set schedule. Indeed, the variety of useful applications for remotely controlling devices using this technology is virtually limitless.

Figure 4:
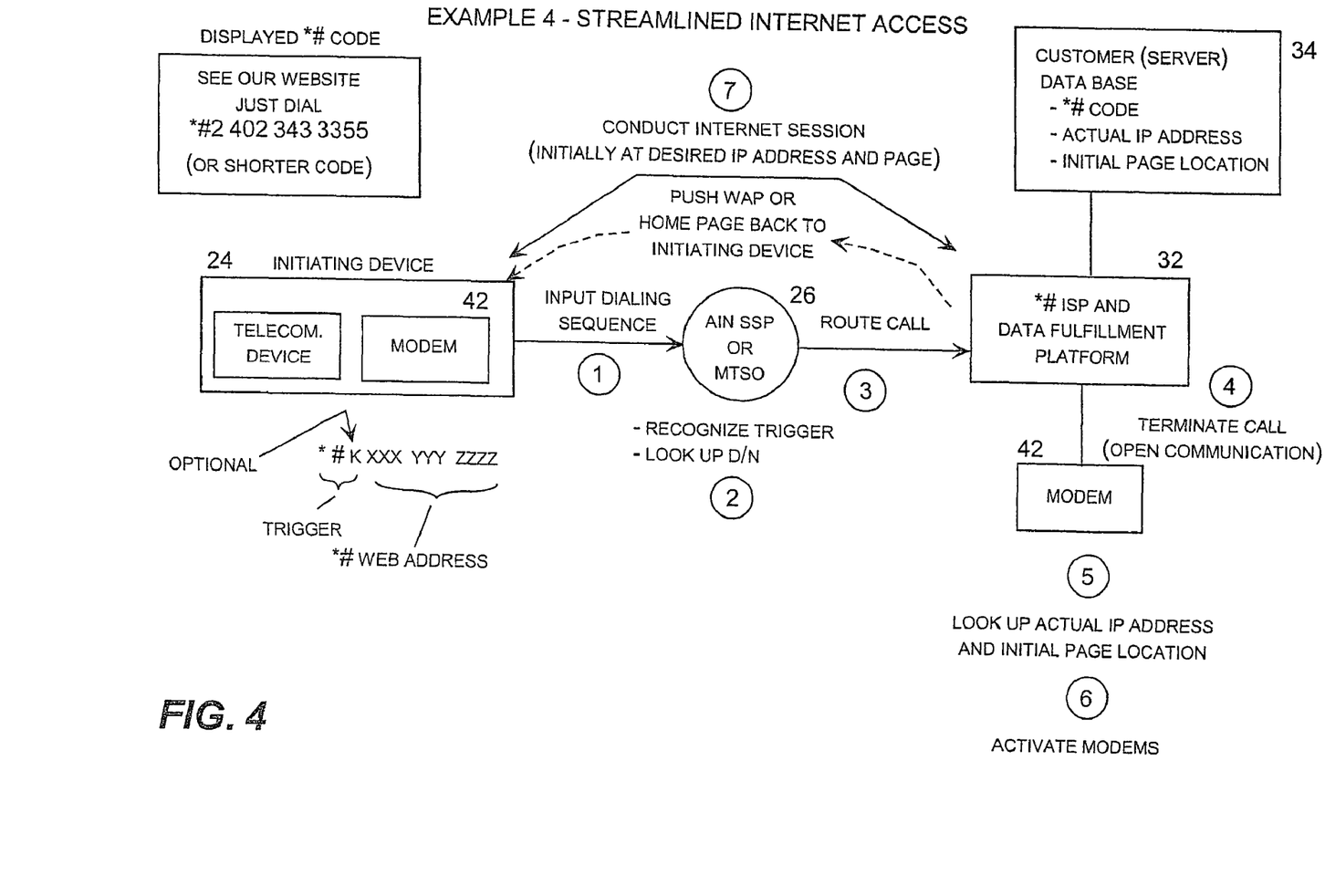
FIG. 4 is a functional diagram of a streamlined Internet access service implemented by a telecommunications initiated data fulfillment system.

FIG. 4 is a functional diagram of a streamlined Internet access service implemented by a telecommunications initiated data fulfillment system 10. This system is similar to the mobile web access system described with reference to FIG. 2, except that the originating telecommunications device 24 includes a modem 42, which allows the device to receive computer data over an analog telephone connection. In addition, the switch 26 does not terminate the incoming call to an announcement, but instead looks up a directory number associated with the input "star, pound" string, and routes the telecommunications call using that directory number in the usual way. The switch 26 also places the input sequence (e.g., *#4 xxx yyy zzzz) in an available field in the routing message header, where it can be retrieved by the data fulfillment platform 30 when it receives the telecommunications call.

The switch 26 then routes the retrieved directory number, which is assigned to the data fulfillment platform 30. In this alternative, the data fulfillment platform 30 operates as a conventional ISP, except that it initiates the Internet session by linking the originating telecommunications device to an Internet page indicated by the input sequence. That is, the data fulfillment platform 30 receives the telecommunications call, maintains an open analog communication with the originating telecommunications device 24, and initiates an Internet session between the originating telecommunications device and the Internet site identified by the input sequence. This is the same method in which analog telephones are used to access the Internet, except that this streamlines the link to the Internet site identified by the input sequence.

For the user of the originating telecommunications device 24, this streamlined Internet access service makes it easier to initiate an Internet session and link to a desired address. That is, the user simply enters an input sequence comprising the appropriate multi-function code service request, and the Internet session automatically initiates with a link established to the Internet site identified by the input sequence. This system may also be modified to provide streamlined access to location-specific data. For example, a predefined "star, pound" code may be used to obtain a road map, weather report, traffic report, or list of restaurants based on the current location of the originating telecommunications device 24.

Figure 5:
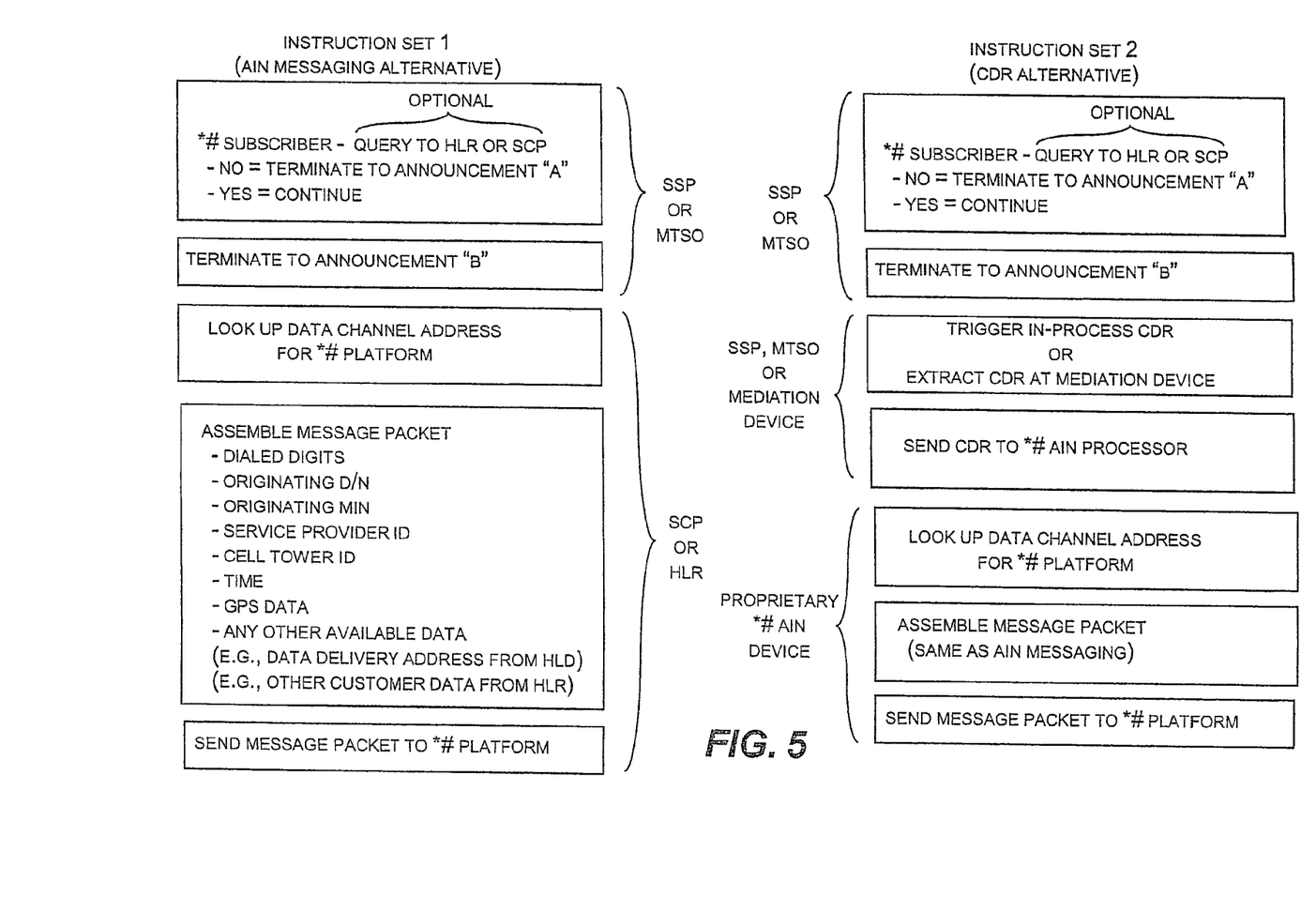
FIG. 5 is an instruction set diagram illustrating advanced intelligent network (AIN) and call detail record (CDR) alternative implementation methodologies for implementing a telecommunications initiated data fulfillment system.

FIG. 5 is an instruction set diagram illustrating an advanced intelligent network (AIN) and call detail record (CDR) alternative implementation methodologies for implementing a telecommunications initiated data fulfillment system. This diagram illustrates the steps that are implemented by specific pieces of equipment to implement the telecommunications initiated data fulfillment system 10 using currently deployed telecommunications infrastructure.

In instruction set 1, the AIN capability of SSP and MTSO telecommunications devices is used to implement the telecommunications initiated data fulfillment system. Specifically, an SSP or MTSO receives the incoming communication from the originating telecommunications device 24, and recognizes the multi-function code trigger event. The SSP or MTSO may then make an optional query to a service control point (SCP) or home location register (HLR) to determine whether the originating telecommunications device 24 is authorized to utilize the "star, pound" system, typically with reference to a subscriber database indexed by the originating directory number (i.e., the directory number assigned to the originating telephone device 24). If the originating telecommunications device 24 is not authorized to utilize the "star, pound" system, the SSP or MTSO terminates the call to an announcement, such as, "You will now be routed to a site where you can register for the star, pound service," and then routes the call to an appropriate registration platform.

If the originating telecommunications device 24 is authorized to utilize the "star, pound" system, the SSP or MTSO terminates the call to an announcement, such as, "Your data request has been received and will be acted on immediately. Thank you." The SCP or HLR then looks up a data address for the data fulfillment platform, assembles the appropriate data message, and transmits the data message to the data fulfillment platform over the SS7 or X-25 signaling system.

Instruction set 2 is similar to instruction set 1, except that a proprietary device reads information from CDRs or in-process CDRs to create the data message. That is, the processing performed by the SCP or HLR in instruction set is shifted to a proprietary device. Specifically, an SSP or MTSO receives the incoming communication from the originating telecommunications device 24, and recognizes the multi-function code trigger event. The SSP or MTSO may then make an optional query to a service control point (SCP) or home location register (HLR) to determine whether the originating telecommunications device 24 is authorized to utilize the "star, pound" system, typically with reference to a subscriber database indexed by the originating directory number (i.e., the directory number assigned to the originating telecommunications device 24). If the originating telecommunications device 24 is not authorized to utilize the "star, pound" system, the SSP or MTSO terminates the call to an announcement, such as, "You will now be routed to a site where you can register for the star, pound service," and then routes the call to an appropriate registration platform.

If the originating telecommunications device 24 is authorized to utilize the "star, pound" system, the SSP or MTSO terminates the call to an announcement, such as, "Your data request has been received and will be acted on immediately. Thank you." The SSP or MTSO then discontinues the communication in the usual way, which triggers the creation of a CDR record. The proprietary device, referred to in FIG. 5 as the "*#AIN processor" extracts information from the CDR or an in-process CDR at the switch or at a mediation device. The proprietary device then looks up a data address for the data fulfillment platform, assembles the appropriate data message, and transmits the data message to the data fulfillment platform over the SS7 or X-25 signaling system.

Figure 6:
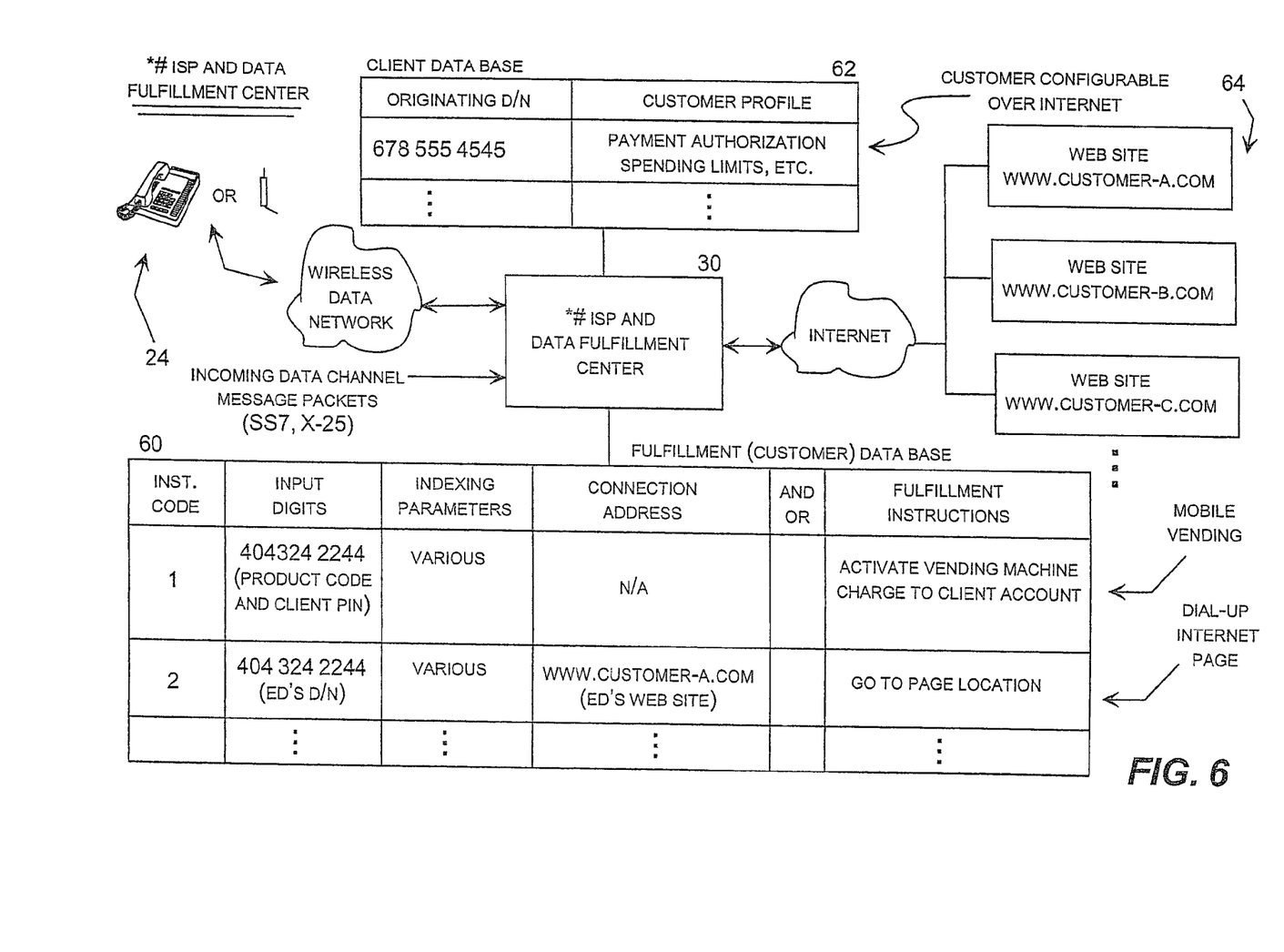
FIG. 6 is a functional diagram of a telecommunications initiated data fulfillment system illustrating features of a data fulfillment database.

FIG. 6 is a functional diagram of a telecommunications initiated data fulfillment system illustrating features of a data fulfillment database. In particular, the telecommunications initiated data fulfillment system shown in FIG. 6 illustrates a *# ISP and data fulfillment center 30 that includes a fulfillment database 60, a client database 62, and Internet interconnection facilities with a plurality of customer web sites 64. In this embodiment, the ISP and data fulfillment center 30 includes all of the intelligence required to implement the telecommunications initiated data fulfillment system, except *# trigger and messaging capability implemented, which is implemented at the SSP and MTSO devices that initially receive the multi-function code service requests. In addition, this SSP or MTSO based functionality may be unnecessary if another type of messaging system is used to deliver the multi-function code service requests from the originating telecommunications device 24 to the ISP and data fulfillment center 30, such as a wireless data network, e-mail, intranet, or any other suitable type of messaging system. The only requirement for implementing the telecommunications initiated data fulfillment system is that the message that reaches the data fulfillment center 30 include two pieces of information, the input sequence (i.e., multi-function code service request initiated by the originating telecommunications device 24) and identification information for the originating telecommunications device 24, such as the directory number assigned to the device.

Figure 7:
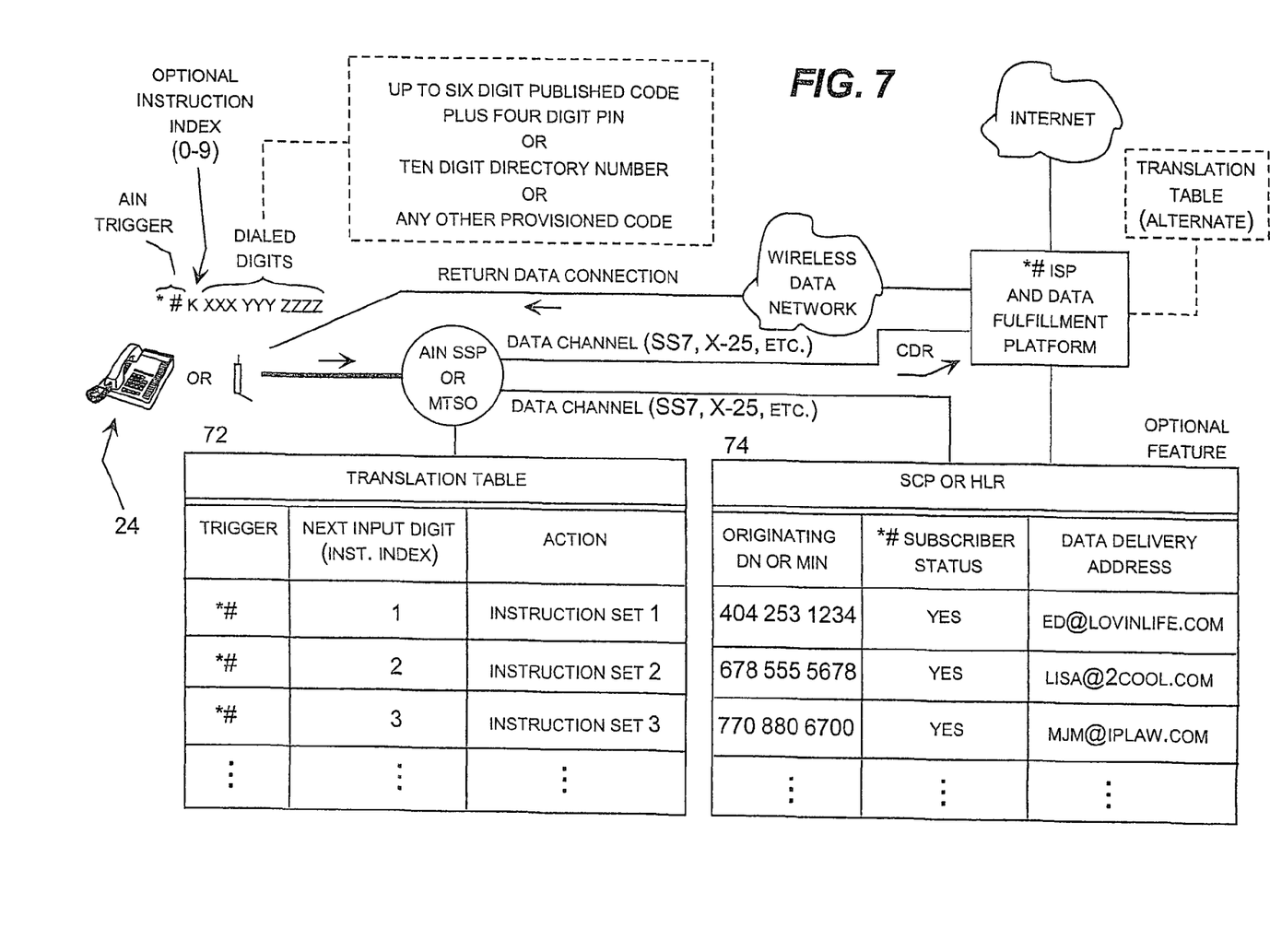
FIG. 7 is a functional diagram of a telecommunications initiated data fulfillment system illustrating features of implemented by an SCP or HLS.

FIG. 7 is a functional diagram of a telecommunications initiated data fulfillment system illustrating features implemented by an SCP or HLS. In this alternative, a large portion of the intelligence necessary to implement the telecommunications initiated data fulfillment system illustrating features of a data fulfillment database is implemented by the SSP and MTO devices through a switch-based translation table 72 and SCP (e.g., for SSP land-line systems) or HLR (e.g., for MTSO wireless systems). Those skilled in the art will recognize that the location of the intelligence is a design choice for the telecommunications initiated data fulfillment system, and will in most applications be driven by the type of entity that is implementing the system. In particular, regional telephone operating companies will most likely prefer the deployment shown in FIG. 7, whereas independent service providers will most likely prefer the deployment shown in FIG. 6.

In another application, the system described herein may be used to implement an abbreviated dialing system. For example, using a double function dialing prefix with a single or multi-digit identifier code that enables individual coding which can be used in both wireless, data, and PSTN networks to create a super ID that is tagged to an individual and superimposes over all device IDs the individual may possess, but is short enough to memorize for the general population (less than 10 digits beyond dialed prefix). This is unique in that it can represent both messaging and real-time communications contacts so that voice, data, video, text, and other forms of communications can reach an individual represented by this ID, not just wireless and PSTN calls or voice messages. Additionally, this number can be entered into a myriad of devices such as a wireless phone, PDA, PSTN phone, 2-way pager, web or IP-enabled device, or video-phone.

In another application, the system described herein may be used to implement a personal directory number system in which a single multi-function code directory number may link to multiple devices or device addresses used by the customer assigned that particular personal directory number. For example, entry of the designated multi-function code plus the customer's personal directory number (i.e., Individual ID) from an originating telecommunication device triggers the launch of the customer's personal contact web page (i.e., individual homepage) and automatic link or push of that page back to the originating telecommunication device. This personal contact web page, which is customizable by the customer, includes the data addresses for multiple communications devices, prioritized contact addresses, time-of-day based contact instructions, and so forth, for communicating with the customer. In addition, the identity of the originating telecommunication device may be used as a prioritizing or indexing parameter by the customer's personal contact web page. For example, the page may display the specific addresses, trigger a conference call, trigger an e-mail instant messaging session, or accept a voice or data message mail, a document, a picture, a music file, or any other suitable type of electronic information.

In particular, a user may enter someone else's Individual ID via manual, directory, or voice, into their cell phone and have that person's individual homepage be delivered via but, not limited to email, web, XML, or WAP. The individual's homepage can contain any information the individual wanted to present, but will also contain a "communications cockpit" which will enable the user to contact the individual through both voice and data means and through any device the individual has tagged under his/her universal ID communications umbrella which may include printers, vehicle communication, or home communication devices. These device IDs can be hidden from the user thereby eliminating need to list multiple contact numbers or addresses and protects anonymity.

The individual will also have the capability of determining rules for prioritizing, filtering, screening, and routing real-time communications and messaging via, but not limited to voice, email, fax, instant messaging, data, WAP, XML, HTML, and file transfer. This is unique in that universal messaging and single number services exist, but are not combined to provide a complete communications and messaging solution for individuals.

The system described herein combines the capabilities of both one number services and integrated messaging, and covers both voice and data communications, enables rules to be built governing when, where, how, and who can communicate with the individual using a myriad of different communications and messaging capabilities while being able to prioritize and select the best method available with the technology to reach to individual from any device that is connected to a wireless, wired voice, data, or IP network.

For example, an individual is sitting at a ball game at six o'clock in the afternoon on a Wednesday. A user decides to contact an individual for the first time by entering the Universal ID for the individual. The data fulfillment platform enables a WAP screen pop of the customer's homepage on the user's originating telecommunications device, in this example a WAP enabled wireless device. This WAP screen offers the user the ability to communicate with the individual in a myriad of ways through wireless interaction with the customer's homepage, such as: tag delivery as urgent, normal, or later delivery; real-time via voice, video, or instant messaging; messaging via voice, email, fax, video, or text. In addition, the customer will have the capability of setting rules within his or her homepage to implement the following: time based filtering and screening; priority filtering and screening; automatic number identification (ANI) based filtering and prioritizing; recognition of universal ID of individual contacting filtering and screening; real-time filtering and screening; dynamic routing of contact; translation text to speech, speech to text, and video to voice; prioritization of reception device based upon all above. For example, one possible prioritization scheme might be: after 6 PM all contacts are messaging to 2-way pager, but if "wife" (Universal ID *#1234567891) or recognized universal IDs marked "urgent" contacts, send to cell phone, if that does not answer send to home phone, if no answer, send to 2-way pager. Of course, a virtually unlimited number of different customer definable prioritization and screening schemes may be implemented using the systems and methods described herein.

In another application, the system described herein may be used to implement a geographic positioning and mapping system using wireless networks, wireless cell towers, and other GPS-like mapping systems to determine location of objects. In particular, the emergency "911" laws are forcing carriers to map the location of users for emergency services using GPS and speed/distance from cell tower location based mapping systems, but this only locates users and does not map objects. By labeling objects with a specific code and using a multi-function code prefix, objects can be coded and the specific object that the user desires can be mapped. By labeling a fixed location object, a user can then identify their location to that object for further action. By mapping an object to a specific location or grid, the object identifier grid system can be much smaller that traditional grid systems such as area or zip code. By localizing object mapping and using the wireless infrastructure, the grid system can shorten the object identifier to less than 5 digits, but remain universal throughout the planet.

In another application, the system described herein may be used to implement user-determined soft switching using a wireless network, separating routing over network based on the presence or absence of a multi-function code dialing prefix. For example, by entering a multi-function code dialed prefix or key word via manual, directory, or voice, the user can select the purpose of usage over a wireless provider's network; internet, communication via voice, communication via text, or voice, video, or text messaging using the same data or voice network. This is unique in that today, the methodology is to complete a call or to specifically enable a data connection via the wireless device, but not to be able to allow the user to determine the format and method of information delivery (messaging) and real-time communication. By enabling user requested functionality, legacy switches can route special function "information actions" through a data network to a platform to fulfill the user requested function while maintaining the existing wireless network for voice traffic.

It should be understood that the foregoing relates only to the exemplary embodiments of the present invention, and that numerous changes may be made therein without departing from the spirit and scope of the invention as defined by the following claims.

The invention claimed is:

1. A method for implementing a telecommunications initiated data fulfillment service comprising the steps of:
at a data fulfillment platform, receiving a data message from a telecommunications switch comprising an item code and identification information pertaining to a telecommunications device in response to the telecommunications switch receiving a communication from the telecommunications device including the item code and a multifunction code;
delivering a response message associated with the item code to the telecommunications device without occupying a communication channel between the telecommunications switch and the telecommunications device.

2. The method of claim 1, further comprising the steps of:
receiving location information pertaining to the telecommunications device in the data message;
customizing the response message based on the location information;
delivering the customized response message to the telecommunications device without occupying a communication channel between the telecommunications switch and the telecommunications device.

3. The method of claim 1, wherein the step of transmitting the response message to the telecommunications device comprises the step of transmitting a text message to the telecommunications device.

4. The method of claim 1, wherein the item code is associated with a product or service offered for sale and the response message is related to the offer for sale.

5. The method of claim 1, wherein the response message causes activation of a browser page on the telecommunications device to initiate an Internet session.

6. The method of claim 1, wherein the data fulfillment center performs the additional step of validating that a user of the telecommunications device is a subscriber of the telecommunications initiated data fulfillment service prior to delivering the response message.

7. The method of claim 1, wherein the data fulfillment center performs the additional steps of:

determining that a user of the telecommunications device is not a subscriber of the telecommunications initiated data fulfillment service; and registering the user as a subscriber of the telecommunications initiated data fulfillment service prior to delivering the response message to the telecommunication device.

8. The method of claim 7, wherein the step of registering the user of the telecommunications device as a subscriber of the telecommunications initiated data fulfillment service further comprises the step of conducting a communication session with the telecommunications device without occupying a communication channel between the telecommunications switch and the telecommunications device.

9. The method of claim 1, wherein the telecommunications switch delivers an audio or data response to the telecommunications device prior to discontinuing the communication to free the first communication channel.

10. A method for implementing a telecommunications initiated data fulfillment service comprising the steps of:
at a data fulfillment platform, receiving a data message from a telecommunications switch comprising an item code and identification information pertaining to a telecommunications device in response to the telecommunications switch receiving a communication from the telecommunications device including the item code and a multifunction code;
obtaining profile data corresponding to the identification information pertaining to the telecommunications device comprising a response address;
delivering a response message associated with the item code to the response address without occupying a communication channel between the telecommunications switch and the telecommunications device.

11. The method of claim 10, wherein the step of transmitting the response message to the response address comprises the step of transmitting a text message to the response address over a wireless data network or the Internet.

12. The method of claim 10, wherein the item code is associated with a product or service offered for sale and the response message is related to the offer for sale.

13. The method of claim 10, further comprising the step of receiving user input to define the response address within a user-editable customer profile associated with the data fulfillment platform or the telecommunications device.

14. A method for implementing a telecommunications initiated product or service delivery system comprising the steps of:
providing an item code for use with a product or service delivery device;
at a data fulfillment platform, receiving a data message from a telecommunications switch comprising the item code and identification information pertaining to a telecommunications device in response to the telecommunications switch receiving a communication from the telecommunications device including the item code and a multifunction code;
transmitting an activation message for activating the product or service delivery device to provide a selected product or service identified by the item code without occupying a communication channel between the telecommunications switch and the telecommunications device.

15. The method of claim 14, further comprising the step of charging a cost associated with the selected product or service to an account associated with the user or the telecommunications device.

16. The method of claim 14, wherein the step of transmitting the activation message comprises the step of transmitting the activation message over a wireless data network or the Internet.

17. The method of claim 14, wherein the data fulfillment center performs the additional step of validating that a user of the telecommunications device is a subscriber of the telecommunications initiated product or service delivery service prior to delivering the activation message to the product or service delivery machine.

18. The method of claim 14, wherein the data fulfillment center performs the additional steps of:
determining that a user of the telecommunications is not a subscriber of the telecommunications initiated to the product or service delivery service; and
registering the user as a subscriber of the telecommunications initiated to the product or service delivery service prior to delivering the activation message to the to the product or service delivery machine.

19. The method of claim 18, wherein the step of registering the user of the telecommunications device as a subscriber of the telecommunications initiated to the product or service delivery service further comprises the step of conducting a communication session with the telecommunications device without occupying a communication channel between the telecommunications switch and the telecommunications device.

20. The method of claim 14, wherein the telecommunications switch delivers an audio or data response to the telecommunications device prior to discontinuing the communication.

* * * * *